UNITED STATES PATENT OFFICE.

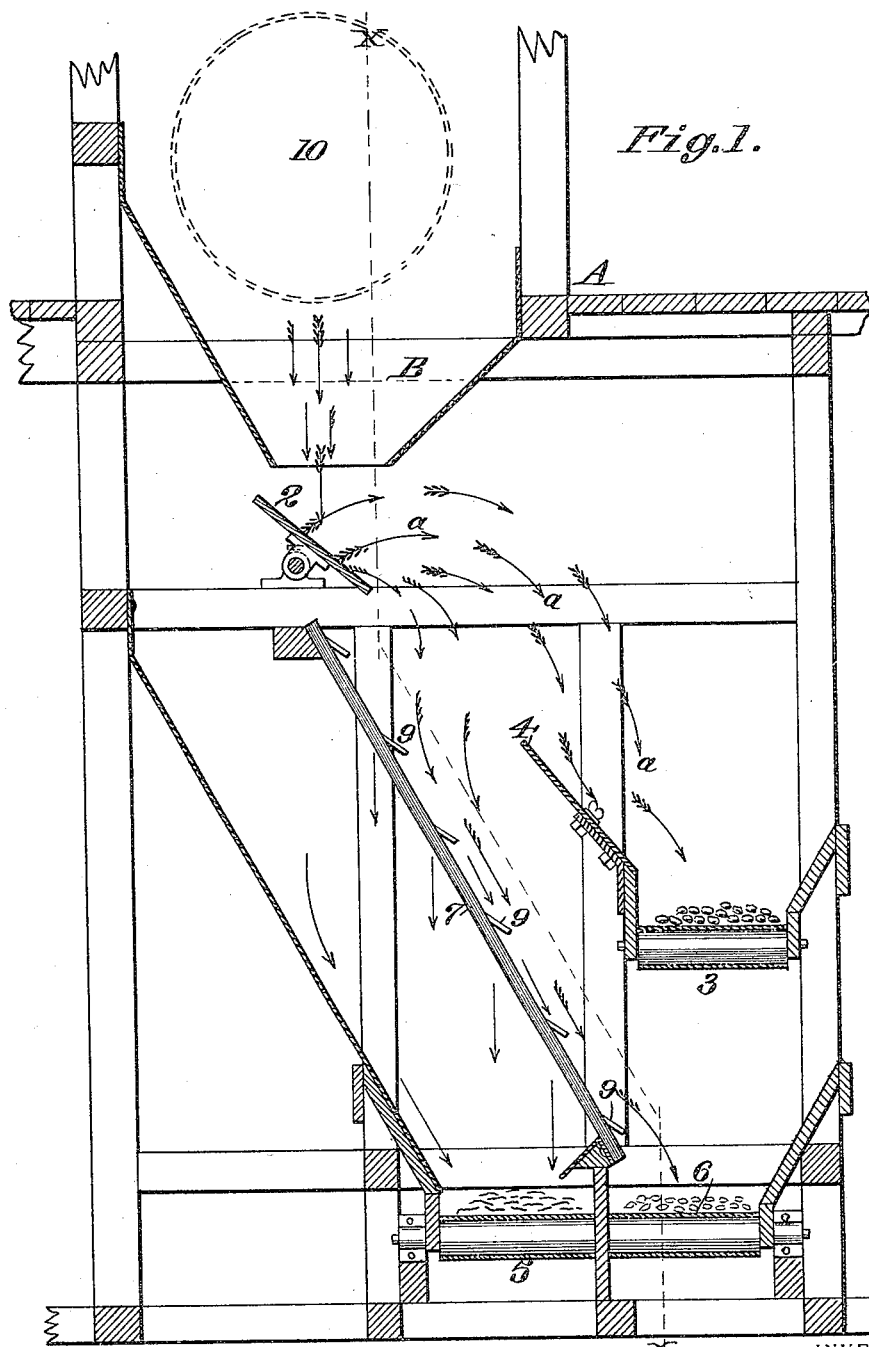

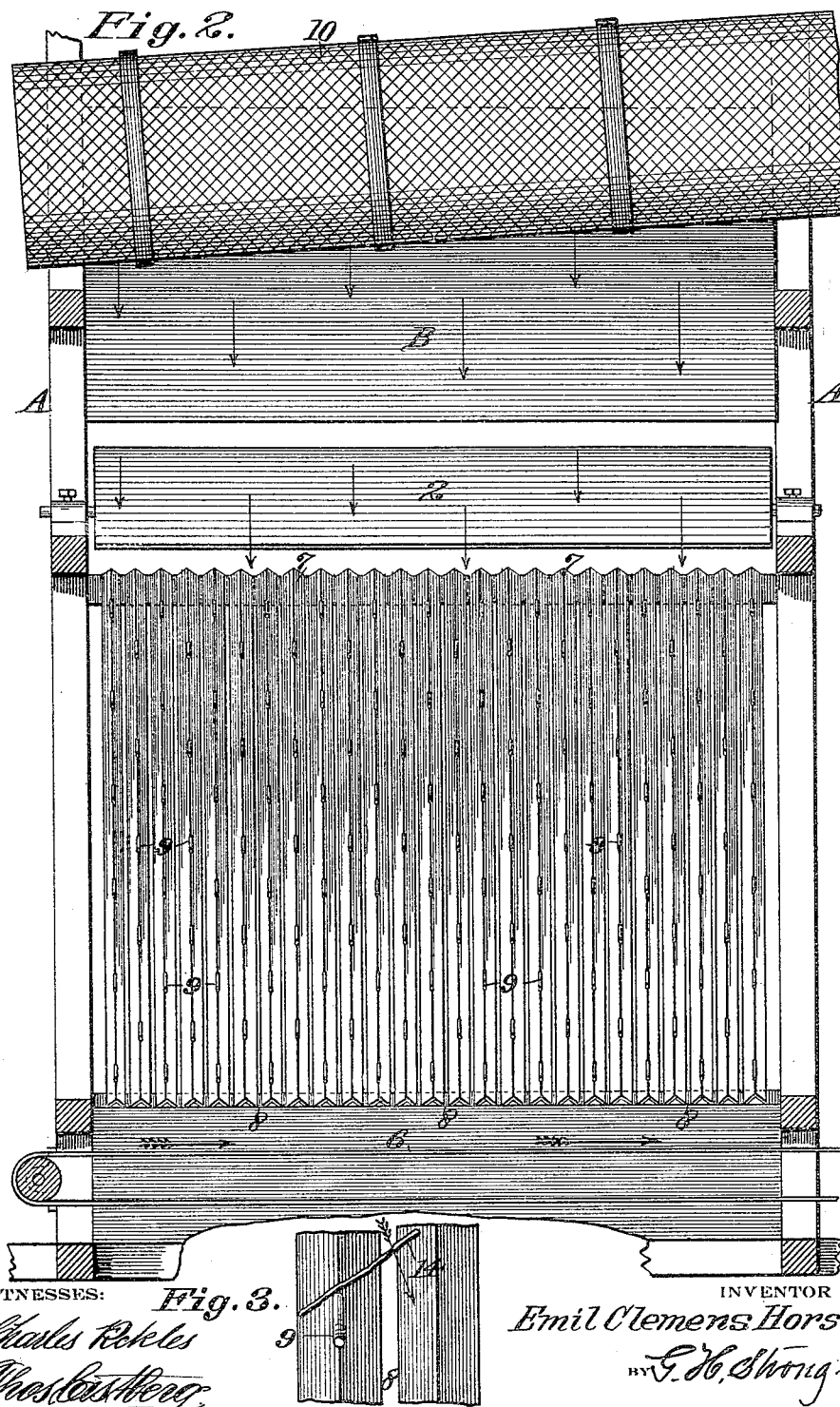

EMIL CLEMENS HORST, OF SAN FRANCISCO, CALIFORNIA, ASSIGNOR TO E. CLEMENS HORST CO., OF SAN FRANCISCO, CALIFORNIA, A CORPORATION OF NEW JERSEY.

HOP-SEPARATOR.

1,136,423.  Specification of Letters Patent.  Patented Apr. 20, 1915.

Application filed May 2, 1914. Serial No. 835,839.

*To all whom it may concern:*

Be it known that I, EMIL CLEMENS HORST, a citizen of the United States, residing in the city and county of San Francisco and State of California, have invented new and useful Improvements in Hop-Separators, of which the following is a specification.

This invention relates to hop separators, and particularly separators which are adapted for separating the stems from the hops.

The object of the invention is to provide a simple, substantial, practical apparatus whereby hops may be readily and automatically separated from the leaves and stems with which they are mixed after being stripped from the vines.

The invention consists of the parts and the construction and combination of parts as hereinafter more fully described and claimed, having reference to the accompanying drawings in which—

Figure 1 is a central, vertical cross section of the hop separator. Fig. 2 is a front elevation on line X—X, Fig. 1. Fig. 3 is a diagrammatic view showing the function of pins 9.

Referring to the drawings, A indicates a suitable frame work, and B a hopper mounted therein. Adjustably mounted below the mouth of the hopper is a deflecting plate 2, and mounted in the frame in front of the deflecting plate and a considerable distance below same is a clean-hop conveying belt 3 on one side of which is mounted an adjustable apron 4.

Suitably mounted in the lower part of the frame below the clean-hop conveyer 3 is a pair of conveyer belts 5 and 6, and interposed between said belts and the deflecting plate is a slotted separating table 7, consisting of a plurality of spaced parallel, inclined angle iron bars separated sufficiently to permit hop stems and the like to drop through their interspaces 8. Suitably secured on the upper edge of each bar are numerous inclined inwardly projecting lugs or pins 9 preferably offset or staggered with relation to the pins on the adjoining bar, the purpose of which pins is to intercept the stems and direct them into the spaces 8 as will be later described.

The function and operation of the deflecting plate, together with the slotted separating table and connected belts will be as follows: Hop leaves and stems with which they are commingled are conveyed to hopper B by any suitable means, as the separating cylinder 10. The hops and such leaves and stems as fall through the separating cylinder will discharge through the hopper onto the deflecting plate 2. Hops are resilient, and as a result rebound and the greater portion of the hops deflect in the direction of arrows $a$ and bound either into the clean-hop conveyer or onto the apron 4, and thence onto the conveyer 3 without coming into contact with any other part of the mechanism. Practically clean hops only will thus reach the conveyer 3, and a high quality of product will result. The adjustable apron indicated at 4 is only provided for the purpose of extending the catching area of the conveyer belt, and the apron may be moved in or out with relation to the deflecting plate through means of screws 12 working in slots in the apron by which the apron is locked in position when once adjusted. Such hops as do not bound sufficiently to get into conveyer 3, together with the leaves and stems which slide off of plate 2 will drop through the space between apron 4 and the plate and be deposited upon the inclined angle bars of the separating table 7. The hops thus deposited will slide down on top of or between the bars, being jolted and turned by the projections or lugs 9, and will be deposited on the conveyer belt, indicated at 6, the spacing between the bars being such as to prevent any hops from falling through. The stems and a portion of the leaves and petals will fall through the slots 8 between the bars; the slots are very narrow in proportion to the hops, but the bars are spaced sufficiently far apart to allow of stems and petals falling through onto conveyer 5 which takes this portion of product to a separating cylinder where the petals are saved. The purpose of the projecting inclined pins or lugs 9 is illustrated in Fig. 3. A stem, as 14, falling on the inclined surface of the bar of table 7 would, unless otherwise directed, have a tendency to slide in about the position in which it was deposited, and without going through and between the bars, to be deposited on conveyer belt 6 with the good hops. This is obviated, however, in the present instance, by the stem being intercepted by the pins 9, which latter turn the stems into parallelism with the bottomless troughs formed between the slots, so that the stems discharge through and onto the waste conveyer 5 rather than on the hop conveyer 6. The clean hops deposited on belts 3 and 6 may be conveyed to any suitable machine where they may be further treated by separation or otherwise, if necessary, or they may be conveyed to separate or common bins for drying, the stems and leaves collected by the belt 5 being similarly conveyed away from the separator for a further separation.

Having thus described my invention, what I claim and desire to secure by Letters Patent is:

1. In a hop separator, the combination of an inclined, slotted, separating table, separating fingers projecting from the table and means for supplying hops, leaves and stems to said table and for causing the separation of the hops by gravity action, the angle of inclination of the separating table being greater than the angle of repose of the hops, substantially as described.

2. In a hop separator, the combination of an inclined, stationary, separating table, said table including bars, the spaces between adjacent bars being unoccupied, and deflecting fingers located at intervals on each bar, substantially as described.

3. A hop separator comprising a separating table, consisting of inclined bars, and a plurality of projections on each bar, said bars including between them parallel, bottomless, V-shaped troughs through which the hops may not pass, but which allow the stems to drop through.

4. In a hop separator, a slotted, inclined separating table, a feed hopper, and a deflecting plate interposed between the hopper and the table and a clean hop conveyer located at one side of said plate and table and adapted to receive hops which rebound from said plate without contact with said table.

5. In a hop separator, a plurality of bars, a hopper through which hops are delivered on said bars, a deflecting plate interposed between the hopper and the bars, means for adjusting the angle of the deflecting plate, and a clean hop conveyer located at one side of said plate and bars and adapted to receive hops which rebound from said plate without contacting said bars.

6. In a hop separator, a plurality of inclined bars, a hopper through which hops are delivered on said bars, a deflecting plate interposed between the hopper and the bars, and projections formed on each bar.

7. In a hop separator, a plurality of inclined bars, a hopper through which hops are delivered on said bars, a deflecting plate interposed between the hopper and the bars, a conveyer belt adapted to receive the hops which are deflected by the deflecting plate, and an adjustable apron mounted on one side of said belt.

8. In a hop separator, a plurality of inclined bars, a hopper through which hops are delivered on said bars, a deflecting plate interposed between the hopper and the bars, a pair of conveyer belts at the lower end of the inclined bars, a conveyer belt adapted to receive the deflected hops, an adjustable apron mounted on one side of said belt, and pins secured to the uper face of each bar, said pins being staggered with relation to each other.

In testimony whereof I have hereunto set my hand in the presence of two subscribing witnesses.

EMIL CLEMENS HORST.

Witnesses:
JOHN H. HERRING,
IRVINE SINNETT.

Copies of this patent may be obtained for five cents each, by addressing the "Commissioner of Patents, Washington, D. C."